(12) United States Patent
Hennessey et al.

(10) Patent No.: US 6,360,216 B1
(45) Date of Patent: Mar. 19, 2002

(54) METHOD AND APPARATUS FOR INTERACTIVE SOURCING AND SPECIFYING OF PRODUCTS HAVING DESIRED ATTRIBUTES AND/OR FUNCTIONALITIES

(75) Inventors: Joseph Hennessey, W. Hempstead; Scott Emerich, Glen Head, both of NY (US)

(73) Assignee: Thomas Publishing Company, New York ( * ) Notice: Subject to any disclaimer, the term of this patent is extended or adjusted under 35 U.S.C. 154(b) by 0 days.

(21) Appl. No.: 09/265,928

(22) Filed: Mar. 11, 1999

(51) Int. Cl.⁷ .............................................. G06F 17/30
(52) U.S. Cl. ................... 707/3; 707/1; 707/10; 707/104
(58) Field of Search ................. 707/104, 1, 3, 707/10

(56) References Cited

U.S. PATENT DOCUMENTS

| | | | | |
|---|---|---|---|---|
| 5,231,566 A | * | 7/1993 | Blutinger et al. | 364/401 |
| 5,890,175 A | * | 3/1999 | Wong et al. | 707/505 |
| 6,101,515 A | * | 8/2000 | Wical et al. | 707/531 |
| 6,125,353 A | * | 9/2000 | Yagasaki | 705/27 |

* cited by examiner

Primary Examiner—Hosain T. Alam
Assistant Examiner—Cam-Y Truong
(74) Attorney, Agent, or Firm—Schnader Harrison Segal & Lewis LLP

(57) ABSTRACT

A method is provided for organizing and retrieving graphical and/or text information pertaining to products. Also disclosed is an apparatus using the methodology of the present invention. A computerized database is provided, in which is entered graphical and/or text information from product catalogues pertaining to the products. An indexer determines and enters into the database structural attribute classification values and solution functionality classification values of the products. A user of the invention interactively selects and retrieves desired graphical and/or text information from the database, which dynamically displays only relevant classification values as the user selects desired structural attribute classification values or desired solution functionality classification values, until the user chooses to select products or to view information associated with selected products. The invention allows the user to view information associated with selected products, and having selected a product, to view information associated with other products having similar solution functionality.

21 Claims, 17 Drawing Sheets

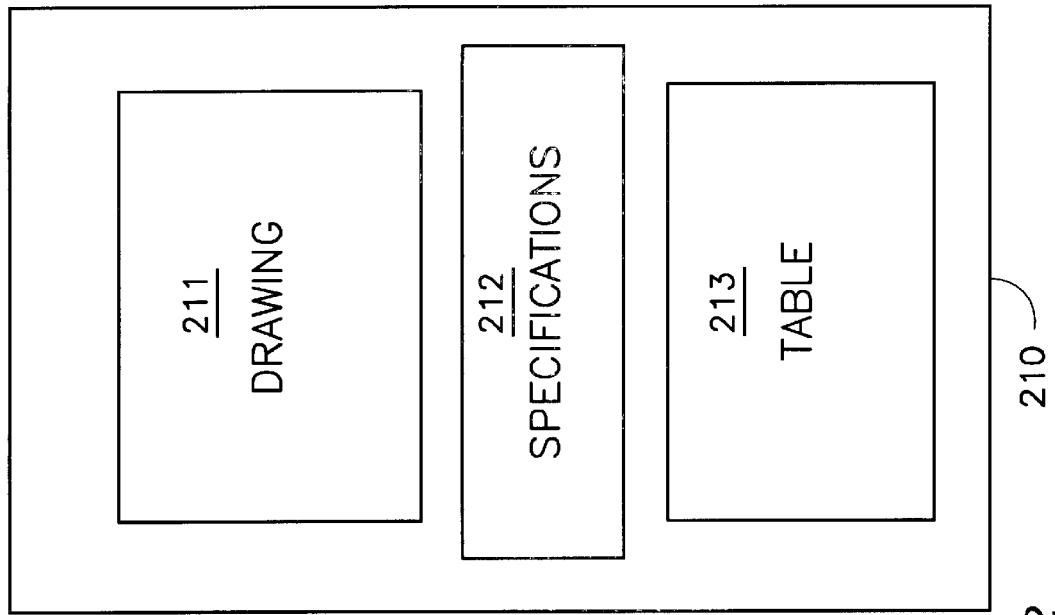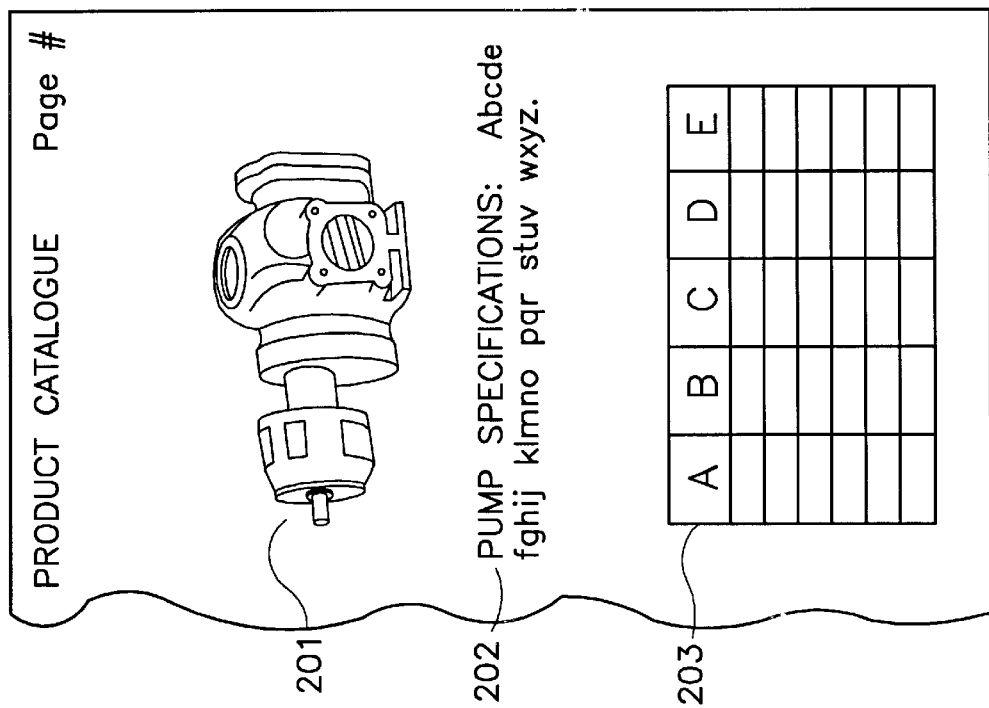
Fig. 2

| Product | Manufacturer |
|---|---|
| Mechanically actuated Sinus multi-plate clutches— Series 0-300 | (Do Octtech |
| Mechanically actuated Sinus multi-plate clutches— Series 0-30-100 | Octtech |

METHOD AND APPARATUS FOR INTERACTIVE SOURCING AND SPECIFYING OF PRODUCTS HAVING DESIRED ATTRIBUTES AND/OR FUNCTIONALITIES

BACKGROUND OF THE INVENTION

1. Field of the Invention

The present invention pertains to a computerized product catalogues system. The invention relates more particularly to a method and apparatus for interactive sourcing and specifying of products having desired structural attributes and/or solution functionalities.

2. Background of the Invention

Product catalogues typically have been provided in the form of printed volumes. Such printed catalogues are widely used for identifying and selecting products and/or services having desired attributes known to the user. A simple form of a publication used to accomplish these purposes is a business telephone directory, such as the *Yellow Pages*, which lists businesses according to predetermined categories of the products or services they provide, such as "pumps." Although that publication helps a user identify providers or manufacturers of a known product or service, the information provided about specific products is located only in advertisements, and is often missing, incomplete, or potentially biased.

Another, more sophisticated, format is exemplified by the widely used *Thomas Register*, a printed catalogue which lists a plurality of subcategories under "pump," such as "hydraulic," and further subcategories under "hydraulic," such as "submersible." Such catalogue systems, known as "fixed hierarchies," have advantages in that the user can proceed from general to specific categories, and may find complete product descriptions, advertisements, photographs, and the like, at the point where the desired product is identified.

Existing electronic catalogues provide the advantage of faster searches through fixed hierarchy catalogue systems. One prior art method, taught in U.S. Pat. No. 5,675,784, discloses a relational database system that links product components, of pre-defined, standard component types, with attributes having specification values and units of measure, in a three-tiered hierarchical data structure. The relational database system allows users to search for specific products based on component criteria, using a series of tables emphasizing consistency and data redundancy, and further provides for mathematical additions of product component measurements by using units of measure and a measurement group table.

Another prior art method, taught in U.S. Pat. No. 5,740,425, similarly depends on a fixed hierarchy, and discloses an electronic catalogue and associated method for creating, maintaining, and publishing multiple renditions of electronic and printed catalogues using a single product database. The complex data structure that was disclosed relies upon a KnowledgeBase which includes a glossary used to search for a particular product or group of products by fixed phrases linked to product characteristics. The product database includes SKUs, each of which corresponds to a product or a component of a product, and the user may search for products or groups of products by SKU. SKU is a common abbreviation for Stock Keeping Unit, which is generally a number associated with a product for inventory purposes.

A shortcoming of such fixed hierarchy catalogue systems is that the user seeking information is locked into thinking within the boundaries of someone else's conception of a standard hierarchy. Prior art product indices may be frustrating to a user who has not preconceptualized his or her search along the lines of their fixed hierarchies.

SUMMARY OF THE INVENTION

The present invention addresses this shortcoming by providing both (1) a "structural attribute index" which allows the user to find product information easily and efficiently, without locking him or her into thinking along the lines of a preconceived fixed hierarchy; and (2) a "solution functionality index," an intelligent search system that allows a user to search for products by function, helping the user to go beyond his or her initial conceptions to discover an alternative or novel solution to an engineering challenge.

The structural attribute index of the present invention provides an advantage over the prior art in that the structural attribute index is adaptable rather than rigid, allowing the user to search in his or her own words, and to locate any listing included in the database, no matter which product attribute the user may start from. It does not require the user to "learn its language," that is, to follow a predetermined hierarchy organized by someone whose thought processes may bear no resemblance to those of the user.

A further advantage of the present invention is that product catalogues are completely indexed by engineers who understand the intricacies of the projects undertaken by users of the present invention, and who provide an engineering foundation during the indexing procedure. This serves to reduces the likelihood of erroneous hits, a common impediment to online searching.

The solution functionality index of the present invention, enabled by the aforementioned built-in engineering knowledge, provides yet another advantage over the prior art by allowing a user to search for potential alternative products. The solution functionality index offers the user the most relevant product selections where the user may not know whether there actually exists any product that can do what the user needs it to; whether there is something close; or whether a particular engineering challenge could be solved in another way altogether. The solution functionality index responds to user inputs by identifying the available products that might answer such needs.

It is a principal object of the present invention to improve the organization, entry, and retrieval of product information. Further objects and advantages of this invention will become apparent from the detailed description of a preferred embodiment, which follows.

The present invention is directed to a method and apparatus for interactive sourcing and specifying of products having desired structural attributes and/or solution functionalities. More particularly, the present invention relates to a method for organizing and retrieving graphical and/or text information pertaining to products, comprising providing a computerized database; entering into said database graphical and/or text information from product catalogues pertaining to the products; determining and entering into the database structural attribute classification values and solution functionality classification values of the products; providing means for a user to interactively select and retrieve desired graphical and/or text information from the database by dynamically displaying only relevant classification values as the user selects desired structural attribute classification values or desired solution functionality classification values, until the user chooses to select products or to view information associated with selected products; providing means for a user to view information associated with selected products; and providing means for a user who has selected a product to view information associated with other products having similar solution functionality.

In another aspect, the invention relates to a method for identifying a product or device having desired attributes or functionality, comprising providing a web server on which accesses a computerized database, in which the database comprises graphical images of catalogue pages or portions of catalogue pages; coordinates and classifications of the pages and/or portions; device identification, structural attributes, and solution functionality of the product associated with the said pages and/or portions. The web server is programmed to provide display information when accessed by a client web browser or software application, to provide selection options, and to compute responses upon receipt of selections from the client. A set of categories having an initial set of selectable structural attribute values and/or solution functionality values is displayed on a client browser or software application, and upon selection of one or more desired values under associated categories, a revised set of selectable values is displayed, meeting the criteria of the selected structural attributes and/or solution functionalities of the initial set. Upon selection of any additional values from the revised set, one or more further revised sets of selectable values are displayed. At the request of the client, a list of all products meeting the criteria of all the selected values is displayed, wherein upon selection by the user of a product from said list of products, a list of classifications of pages or portions of product catalogue pages for the selected product is displayed, and upon selection by the client of a classification from said list of classifications, the portion of the product catalogue page meeting the classification criteria is displayed. Upon request by the client to see alternatives to a product previously selected, a new list of selectable solution functionality values is displayed, corresponding to those of the previously selected product.

In still another aspect, the invention comprises a computer implemented system for identifying desired products and viewing information associated with the products, comprising an electronic computer having a processor and a database, in which the database has graphical images of catalogue pages or portions of catalogue pages; coordinates and classification of the pages and/or portions; device identification, structural attribute values, and solution functionality values (consisting of function, object, and method) of the product associated with the pages and/or portions. The system is adapted to display a search option screen comprising one or more selectable categories and one or more selectable structural attribute and/or solution functionality values under those categories, and upon selection of one or more structural attribute and/or solution functionality values within the categories, to display a subset of values which meet the criteria of the selected values. The system is also adapted to display at the request of a client a list of all products which meet the criteria of the selected value or values, and upon selection by the client of one or more products from said list, to display a list of classifications of the portions of product catalogue pages for the selected product(s), and upon selection by the client of a classification from said list of classifications, to display the portion(s) of the product catalogue pages meeting the classification criteria. The system is further adapted to display information associated with alternative products having similar solution functionality values to a product previously selected.

BRIEF DESCRIPTION OF THE DRAWINGS

Other features and advantages of the present invention will be described in further detail with reference to the accompanying drawings. The figures of the accompanying drawings illustrate the present invention by way of example and not limitation.

FIG. 2 illustrates a page of a printed product catalogue.

FIG. 15 illustrates the product pane.

DETAILED DESCRIPTION

The invention will be understood more fully from the detailed description given below, which however, should not be taken to limit the invention to a specific embodiment, but is for explanation and understanding only.

The Computer System

Figure 1:
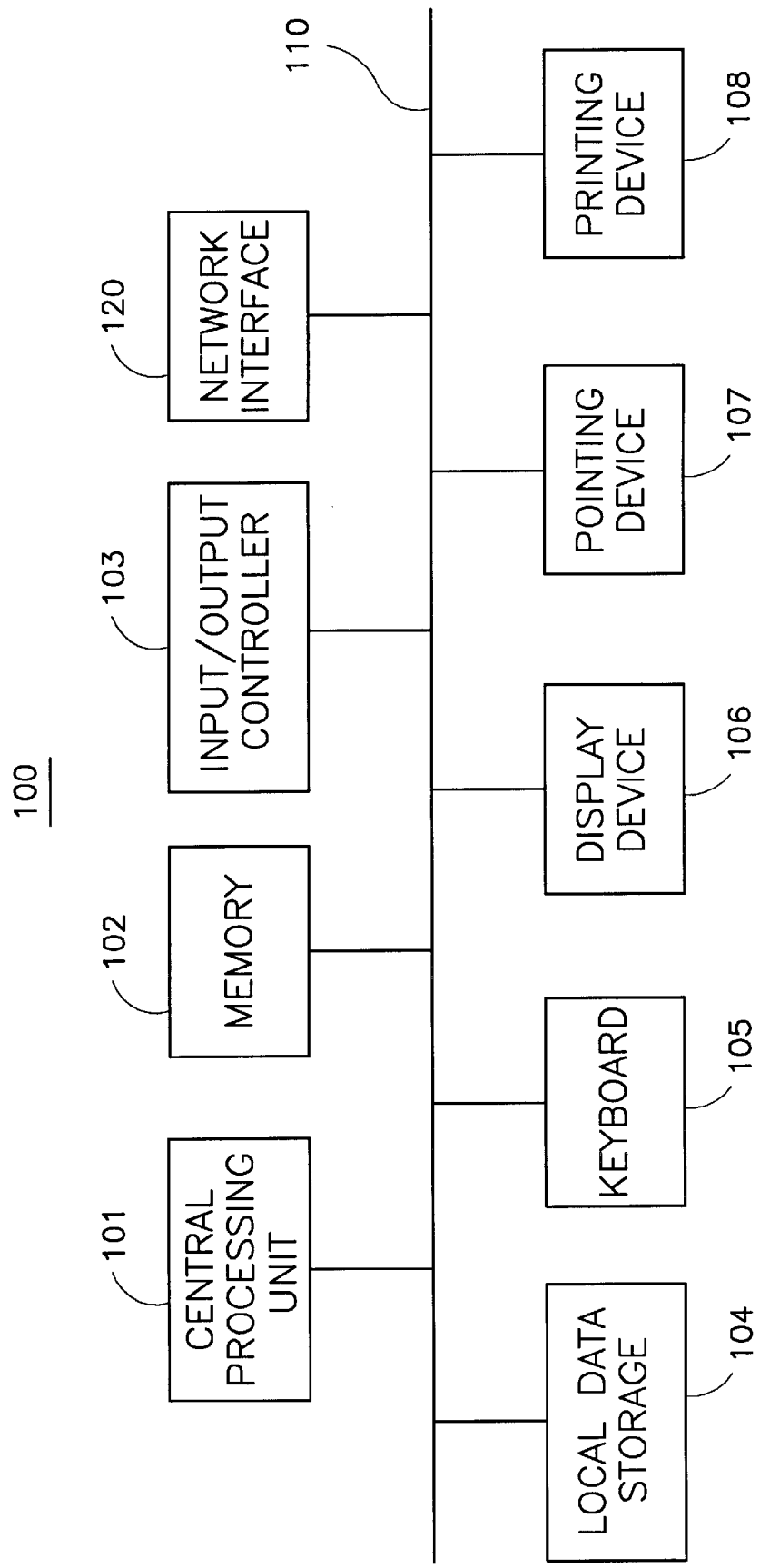
FIG. 1 is a block diagram of a computer system in which the present invention may be embodied.

As shown in FIG. 1, the present invention may be embodied on a computer system such as the system 100, which comprises a central processing unit 101 (e.g., one or more Pentium II processors, available from Intel Corporation), electronic memory 102, an input/output controller 103, and one or more local data storage devices 104 (e.g., hard disk, floppy disk, embedded firmware, CD-ROM). Input/output devices such as a keyboard 105, a display device 106, a pointing device 107 (e.g., mouse, trackball, pen device, or the like), and a printing device 108, may be included in the system 100 as desired. As illustrated, the various components of the system 100 communicate with one another through a system bus 110 or similar architecture and may also communicate with additional computer systems through a network interface 120 having( connections to the Internet or to a local- or wide-area network.

A computerized database of the present invention is provided on a system 100. The system 100, functioning as a network web server, has a database which may be accessed by means of the Internet. The present invention may reside entirely on a single system 100, or may be distributed across a plurality of systems 100 which may include network servers and clients connected through network interfaces 120. In a preferred embodiment, portions of the methodology of the present invention are carried out on a relational database using Oracle database server software (available from Oracle Corporation) residing on a system 100 which includes a personal computer adapted to function as a network server and to be accessible by means of the Internet or World Wide Web, which is available from several vendors (including IBM Corporation), and additional portions of the methodology are carried out on one or more additional systems 100 by means of network interfaces 120; but it will be understood that the present invention may be usefully implemented by means of any database management system, including relational, object-oriented, and the like, residing on one or more computer systems 100 having any variety of processor or architecture.

Catalogue Images

Graphical information and/or text information is entered into the database from product catalogues. The person or persons providing the database of the present invention select product catalogues to be included, based upon the usefulness of their content to the end user of the database.

An example of a printed product catalogue selected for inclusion in the database of the present invention is shown in FIG. 2. Each catalogue page 200 is scanned so as to produce for each catalogue page 200 a data file comprising a graphical page image 210. Textual portions of the graphical page image 210 are converted into text files comprising the corresponding textual data by applying optical character recognition (OCR) to the graphical page image 210. The procedures for scanning pages and applying OCR are well known.

The resulting text files and graphical data files may be stored on electronic or other media, and then provided to indexers for viewing,, indexing, and entry into the database of the present invention. It is to be understood that the present invention is not limited to including pages from printed product catalogues, but may also incorporate information from existing electronic catalogues, which having already been rendered into electronic form may be given to indexing personnel for classification without the step of scanning.

At any time subsequent to selection of the catalogue, an indexer or other person determines and enters into the database catalogue information and manufacturer information. The catalogue information is general information relating to the selected catalogue, including the title, edition, and the like. The manufacturer information is information relating to the manufacturer whose products are represented in the catalogue, including the manufacturer's name, mailing address, e-mail address, phone number, and the like.

A catalogue page 200 may comprise one or more portions, each having a classification. Upon viewing the graphical page image 210, an indexer determines whether and how the page may be divided into logical portions. In the illustration of a representative catalogue page 200, three typical portions are shown by way of example: drawing 201, specifications 202, and table 203.

The indexer selects cropped graphical or textual portions of the viewed page by visually determining the corners of each portion of graphical page image 210, and using a pointing device 107 or other means to crop the graphical page image 210 by disregarding areas outside the selected portion. The page identification of the selected portion, and the X and Y coordinates within the graphical page image 210 corresponding to corners of the selected portion, are thereby determined and entered into the database.

The indexer designates each resulting cropped rectangular region of the graphical page image 210 as a graphical and/or textual portion having a distinct classification. The indexer determines a classification for each of the portions, and in our example, enters into the database the classification of portion 211 as a drawing, portion 212 as specifications, and portion 213 as a table.

Overview of Data Relationships

Having begun to show how information drawn from a product catalogue is determined and entered into the database, it is useful to consider the logical relationships within the database itself.

Figure 3:
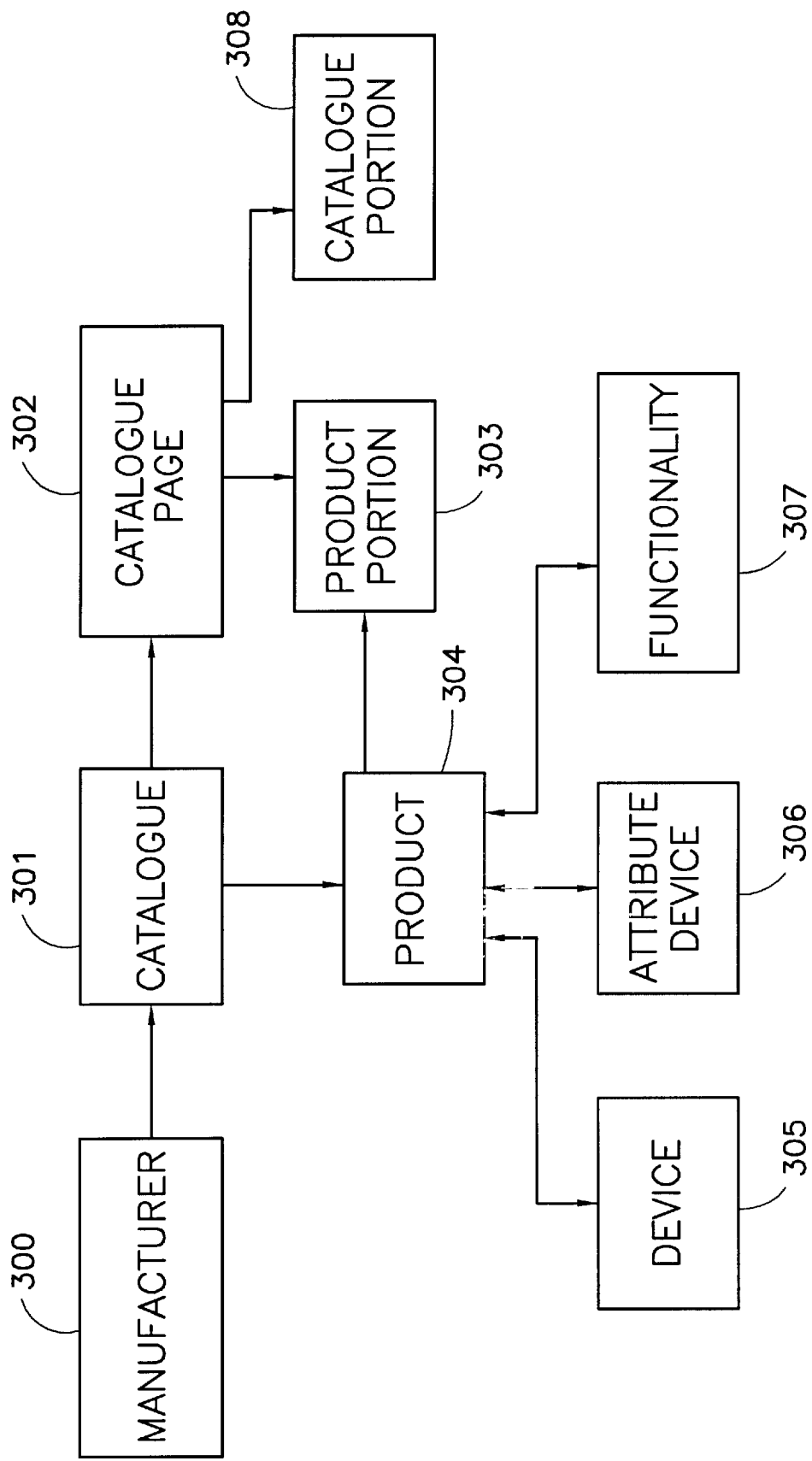
FIG. 3 is a block diagram illustrating a simple overview of the relationships in the database of the present invention.

Referring now to FIG. 3, there is shown a simple overview of the relationships in the database of the present invention, in which the direction of each arrow represents a potential one-to-many relationship. Each manufacturer 300 has one one more catalogues 301. Each catalogue 301 has one or more catalogue pages 302 (as illustrated in FIG. 2 by the sample catalogue page 200), each of which is stored in the form of a graphical page image 210. Each catalogue page 302 may have one or more product portions 303 (as illustrated in FIG. 2 by sample portions 211–213), or may have one or more catalogue portions 308.

Each catalogue page 302 may also list one or more products 304, and each product 304 is described in one or more product portions 303 of the catalogue page 302. Each product 304 falls under the classification of one or more devices 305, and is described by one or more structural attributes 306, and has one or more solution functionalities 307.

One or more engineers enter, index, and/or review all data entered into the database. Each portion of the catalogue page 302 is reviewed by an indexer. For each portion, the indexer determines and enters whether it is a product portion 303 or a catalogue portion 308. If the portion describes or corresponds to one or more products 304, it is a product portion 303. If the portion describes or corresponds to no particular product 304, but rather contains general information relating to the manufacturer 300 or the catalogue 301, it is a catalogue portion 308.

Catalogue Information

A catalogue portion 308 corresponds to portions of catalogue pages 302 containing non-product-specific information such as the front cover, back cover, general company information, general product information, logo, warranty information, and the like. A portion consisting of a blank page in the catalogue may either be discarded as non-informational, or retained as a catalogue portion 308 because it contains no product-specific information.

Figure 4:
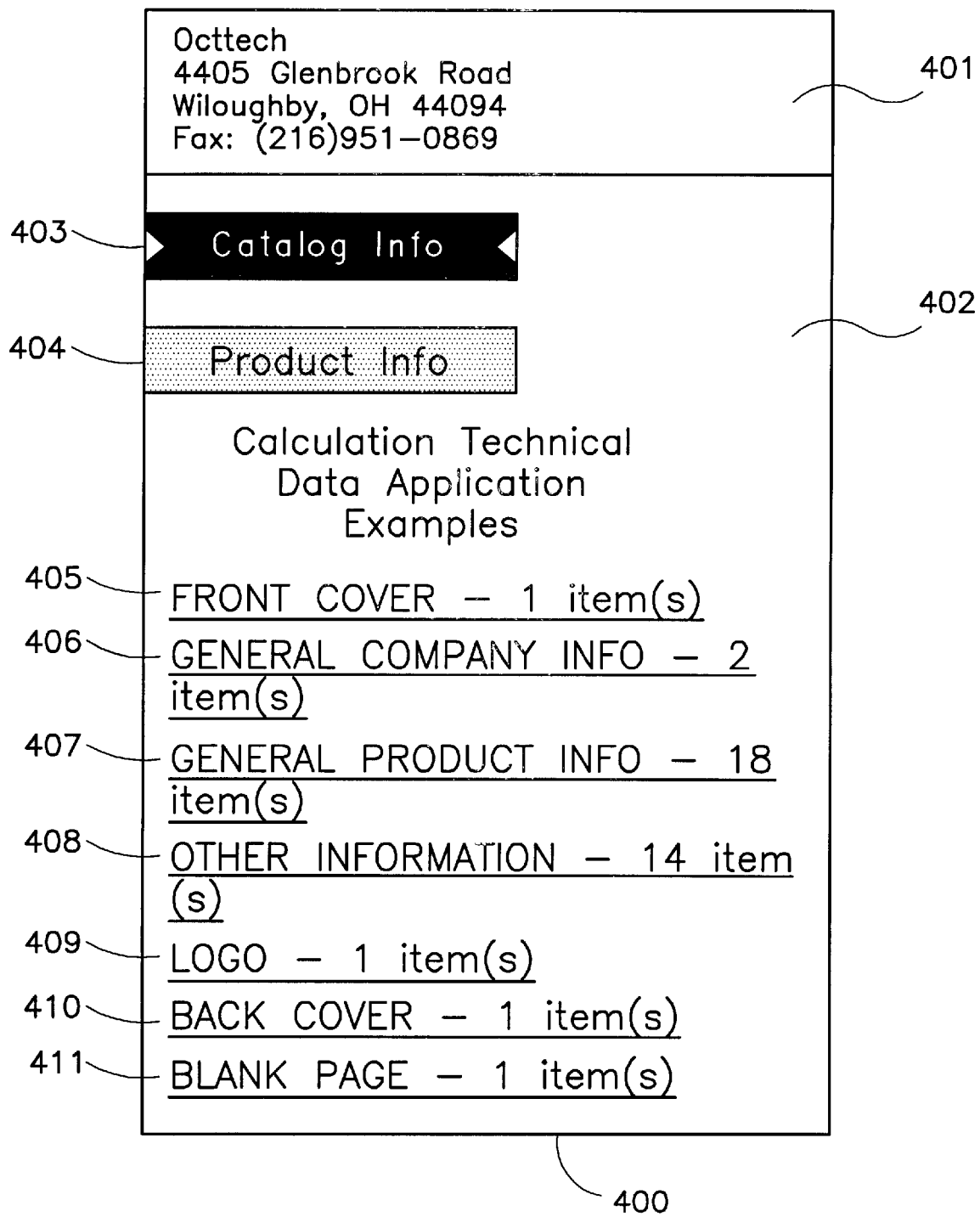
FIG. 4 illustrates catalogue portions from the perspective of the user.

FIG. 4 illustrates the catalogue portions 308, from the perspective of the user rather than that of the indexer. In FIG. 4, there is shown an example of a display panel 400 relating to general information from a catalogue 301 (from FIG. 3). Pane 401 displays information about the manufacturer 300 (from FIG. 3), and pane 402 displays information drawn from the catalogue 301. The user may select button 403 or button 404, using keyboard 105 or pointing device 107 (from FIG. 1), and upon selection by the user, the selected button is highlighted and the display in pane 402 changes accordingly. Button 403 displays the words "Catalog Info," and is highlighted, indicating that pane 402 is displaying information relating to catalogue portions 308 (from FIG. 3). Button 404 displays the words "Product Info," and is not highlighted, indicating that pane 402 is not displaying information relating to product portions 303 (from FIG. 3). This example shows that for the selected catalogue 301, seven distinct classifications 405–411 of catalogue portions 308 have been entered by the indexer. For each classification 405–411, there may be one or more catalogue portions 308 that are so classified; for example classification 407 describes eighteen catalogue portions 308 which were classified as "general product info" by the indexer, because they related generally to the plurality of products 304 described in the catalogue 301, but to no particular product 304.

Product Information

A product portion 303 corresponds to portions of catalogue pages 302 containing product-specific information such as specifications, descriptive text, pictures, drawings, schematics, tables, and the like.

For each product 304, a product name corresponding to the product 304 is determined and entered into the database, corresponding to the name given to the product 304 by the product's manufacturer 300. For each product portion 303, the indexer enters into the database the correspondence between product portion 303 and one or more products 304 in the database.

Figure 5:
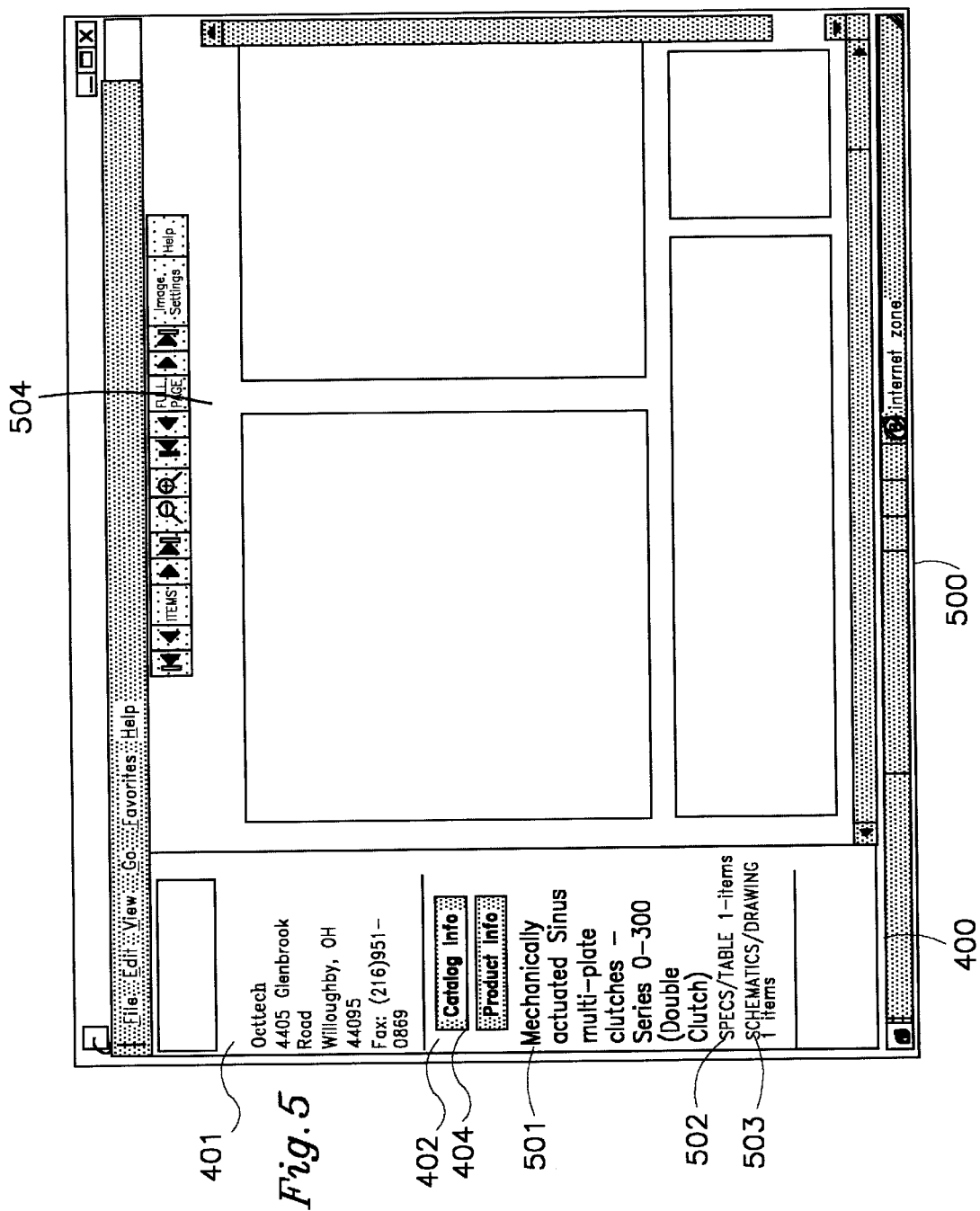
FIG. 5 illustrates product portions from the perspective of the user.

FIG. 5 illustrates a product portion 303 (from FIG. 3), from the perspective of the user rather than that of the indexer, and places display panel 400 in the context of display screen 500. In FIG. 5, there is shown an example of a display screen 500, such as might be displayed on display device 106 (from FIG. 1), and display panel 400 is shown within the left side of display screen 500. Pane 401 displays information about the manufacturer 300 (from FIG. 3), and pane 402 displays information drawn from the catalogue 301 (from FIG. 3). In this example, the user has selected button 404; therefore, pane 402 is displaying information relating to product portions 303. Pane 402 displays the product name 501 corresponding to the selected product 304 (from FIG. 3). This example shows that for the selected product 304, two product portions 303 have been entered by the indexer. For each product portion 303, the display shows its classification. Listed in this example are specs/table 502, and schematics/drawing 503, each of which is the classification of a particular instance of a product portion 303 corresponding to coordinates in a graphical page image 210 (from FIG. 2).

Page display 504 is shown within the right side of display screen 500. Using keyboard 105 or pointing device 107 (from FIG. 1), the user has selected specs/table 502. Therefore, the page display 504 shows the cropped rectangular region of the graphical page image 210 corresponding to the particular instance of a product portion 303 that has been classified as specs/table 502.

Structural Attribute Classification Values

Each product 304 (see FIG. 3) can be broadly described as falling within one or more device identifications. For example, a specific product 304 may be a kind of pump, or a kind of circuit, or a kind of clutch. In the preceding sentence, "pump," "circuit," or "clutch" are device identifications, stored in the database as a device 305.

Figure 6:
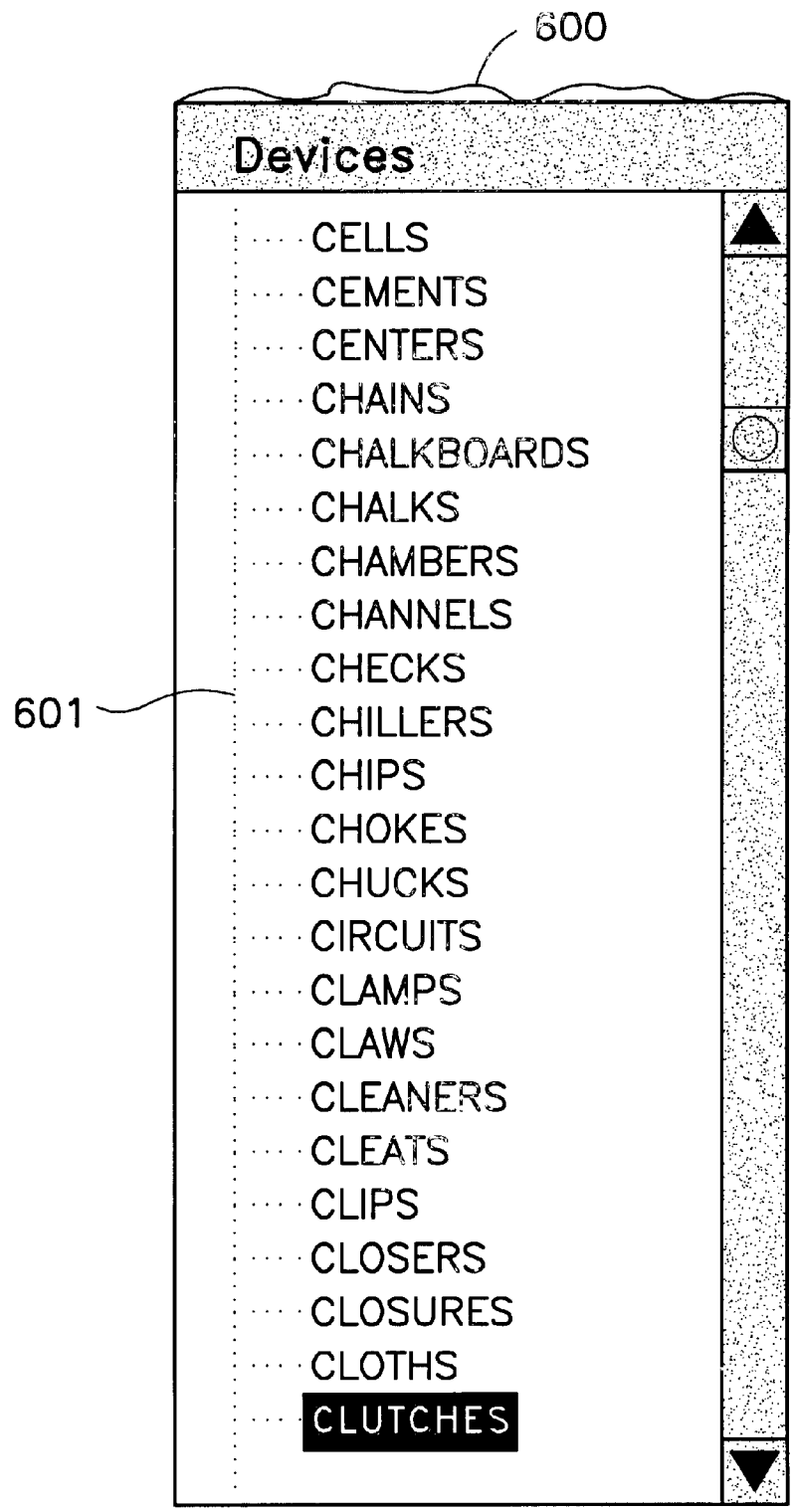
FIG. 6 shows a device pane displaying a portion of an exemplary list of devices.

For each product 304, one or more devices 305 identifying and classifying the product 304 are determined and entered into the database by the indexer. Referring now to FIG. 6, there is shown a device pane 600 displaying a portion of an exemplary device list 601 showing a plurality of devices 305 (from FIG. 3), each of which may correspond to one or more products 304 (from FIG. 3). Device list 601 comprises a set of selectable device values. "The indexer identifying a product 304 is not limited to the devices 305 identified in this list 601, but may select any previously entered device 305 from the database, or may create a new device 305.

Figure 7:
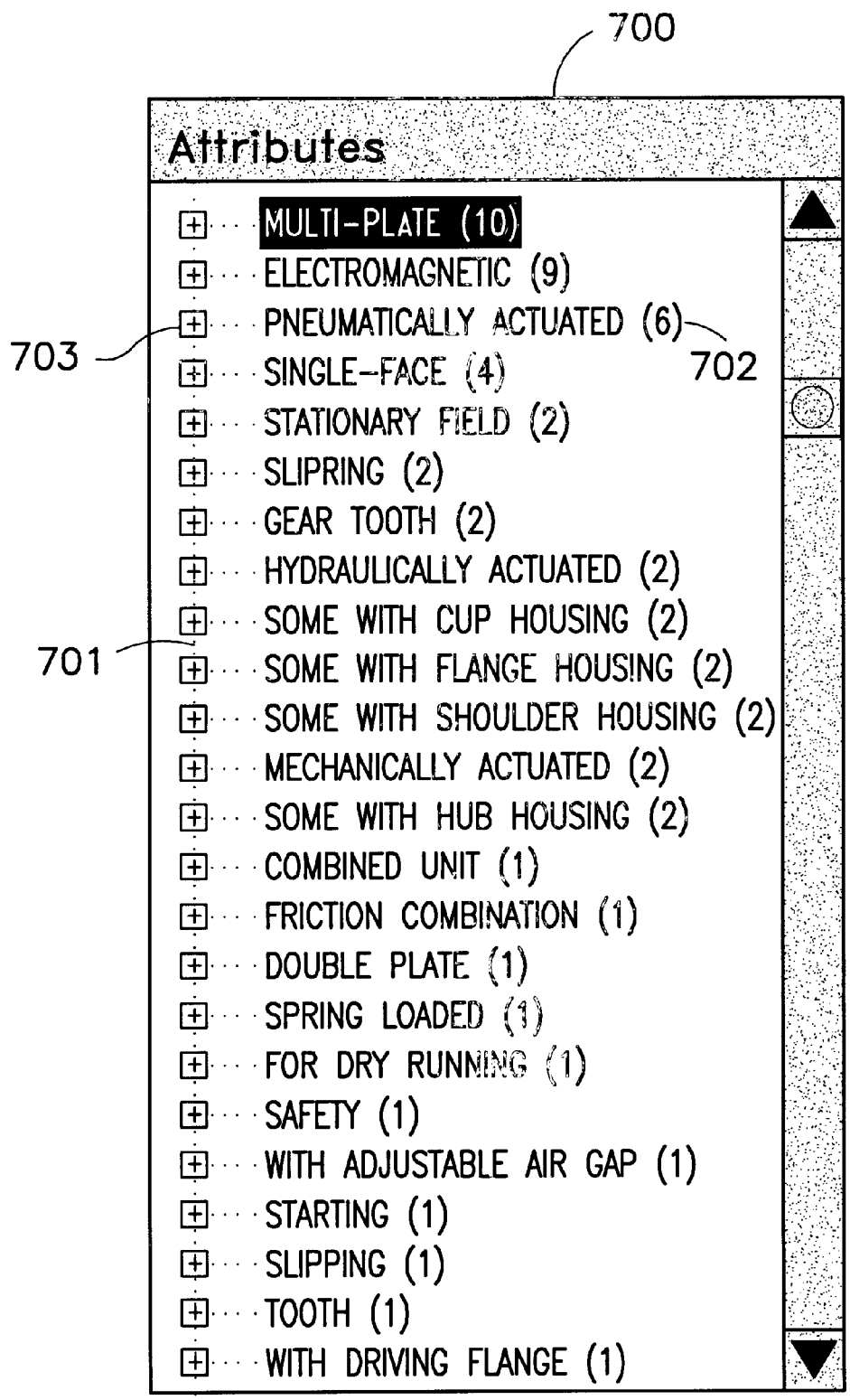
FIG. 7 shows an attribute pane displaying a portion of an exemplary list of attributes.

For each product 304, one or more attributes 306 (see FIG. 3) describing the product 304 are determined and entered into the database by the indexer. Referring now to FIG. 7, there is shown an attribute pane 700 displaying a portion of an exemplary attribute list 701 showing a plurality of attributes 306 (from FIG. 3), each of which may correspond to one or more products 304 (from FIG. 3).

A number 702 showing how many products 304 are described by each attribute 306 is displayed in each entry of list 701. A user may expand one or more values and thereby display values associated with the expanded value. Box 703 shows a plus or minus sign. Where a box 703 shows a plus, the user may select the box 703 and all values under it will be displayed. Where a box 703 shows a minus, the user may collapse the previously expanded values in the display to their previous state.

Attribute list 701 comprises a set of selectable attribute values. The indexer, in identifying a product 304, is not limited to the attributes 306 identified in this list 701, but may select any previously entered attribute 306 from the database, or may create a new attribute 306. These attributes 306 include descriptive structural or other elements such as material, composition, features, inputs, outputs, capabilities, limitations, options, locations, design characteristics, physical characteristics, and the like.

A flexible dynamic hierarchy of structural attributes is built by entering into the database relationships of one or more products 304 to each attribute 306. The expert engineering knowledge of the indexers and/or reviewers enables both creativity in the creation of attributes 306, and consistency in the selection of existing attributes 306. Because each product 304 typically has a plurality of attributes 306, and because expert engineering knowledge provides consistency within the list of previously existing attributes 306, many attributes 306 will be shared by a plurality of products 304. The flexible dynamic hierarchy of structural attributes allows, for example, searching for devices 305 by the attributes 306 of corresponding products 304, so that a user who does not know which device 305 corresponds to the user's needs, or a user who knows that a plurality of devices 305 correspond to the user's needs, can easily locate every device 305 and product 304 having the desired attribute 306.

Solution Functionality Classification Values

Figure 8:
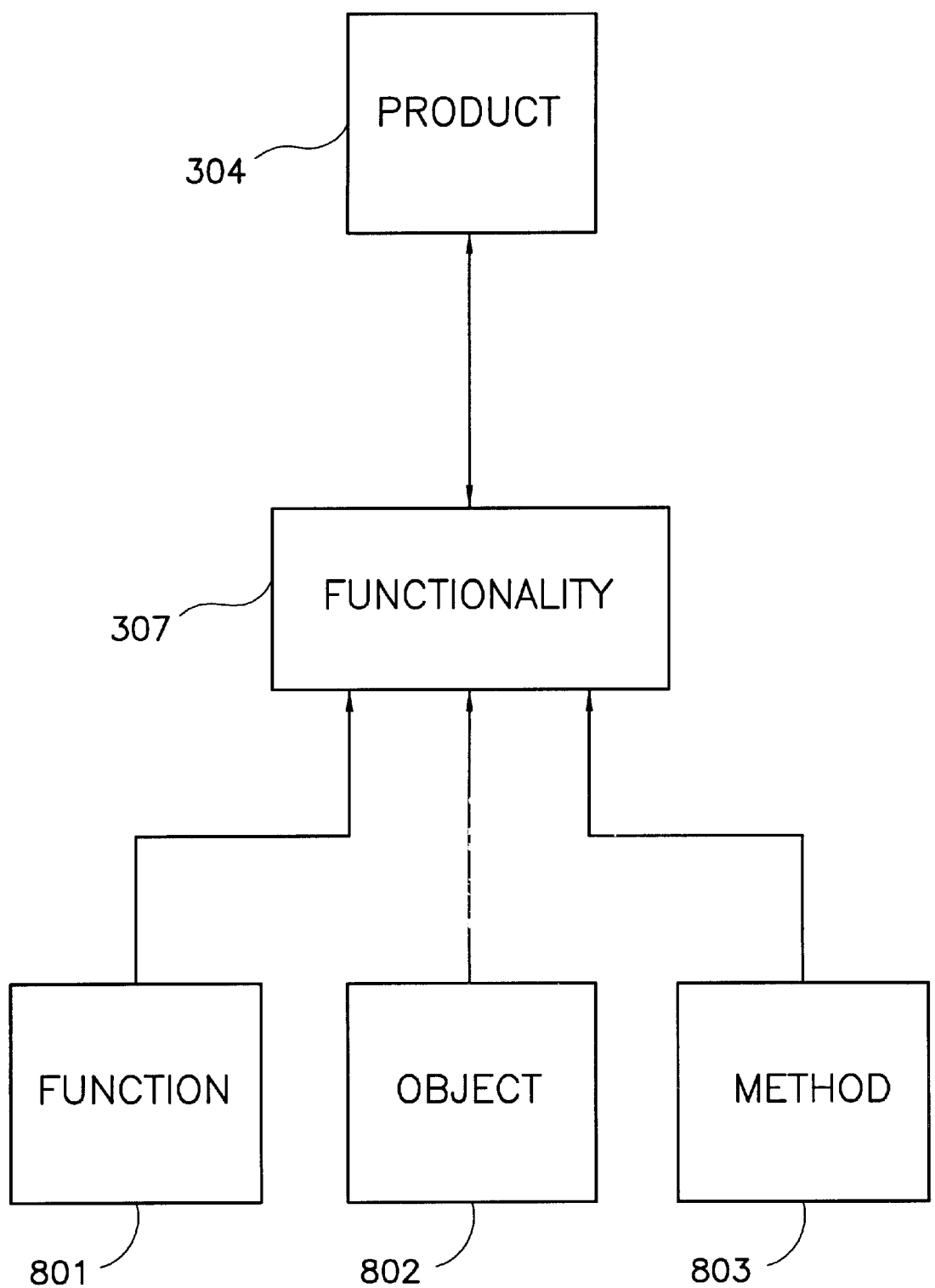
FIG. 8 illustrates a simple overview of the solution functionality relationships.

FIG. 8 illustrates a simple overview of the solution functionality relationships in the database of the present invention. Any product 304 may have one or more functionalities 307 (see FIG. 3); in other words, a product 304 may be useful for a variety of purposes. Similarly, any functionality 307 may describe a purpose that can be satisfied by a variety of products 304.

Solution functionality classification values are determined and entered into the database by determining and entering the three elements of a functionality 307, which are the function 801, the object 802, and the method 803. When an indexer is entering a product 304 into the solution functionality index, the indexer determines one or more functions 801 of the product corresponding to the product 304, one or more objects 802 of said function 801, and one or more methods 803 identifying how the function 801 relates to or achieves the object 802 of the product 304.

For practical purposes, the functionality 307 may be loosely analogized to the grammatical structure of a simple English sentence, in which the product 304 is the subject, function 801 is the verb, object 802 is the object, and method 803 follows the phrase "by means of." By way of example, an indexer determining one of the functionalities 307 of a ballpoint pen may conclude, "A ballpoint pen marks paper by means of rolling," and enter function 801 as "mark," object 802 as "paper," and method 803 as "rolling." An indexer may determine additional functionalities for the same ballpoint pen, for example, "A ballpoint pen writes information by means of ink." An indexer determining the functionalities 307 of a fountain pen or a marker may reach the same conclusions, and enter the same functions 801, objects 802, and methods 803.

A flexible dynamic hierarchy of solution functionalities is built by entering into the database relationships of one or more products 304 to each functionality 307. The expert engineering knowledge of the indexers and/or reviewers enables both creativity in the creation of functions 801, objects 802, and methods 803, and consistency in the selection of existing functions 801, objects 802, and methods 803. Because each product 304 typically has a plurality of functionalities 307, and because expert engineering knowledge provides consistency within the list of previously existing functions 801, objects 802, and methods 803, many functionalities 307 will be shared by a plurality of products 304. The flexible dynamic hierarchy of solution functionalities allows, for example, searching for an unknown product 304 or device 305 based upon the desired functionality 307, which may be determined by reviewing the functionalities 307 of a known product 304. In this way, a user who does not know which device 305 corresponds to the user's needs, or a user who knows that a plurality of devices 305 correspond to the user's needs, can easily locate every device 305 and product 304 having the desired functionality 307.

Figure 9:
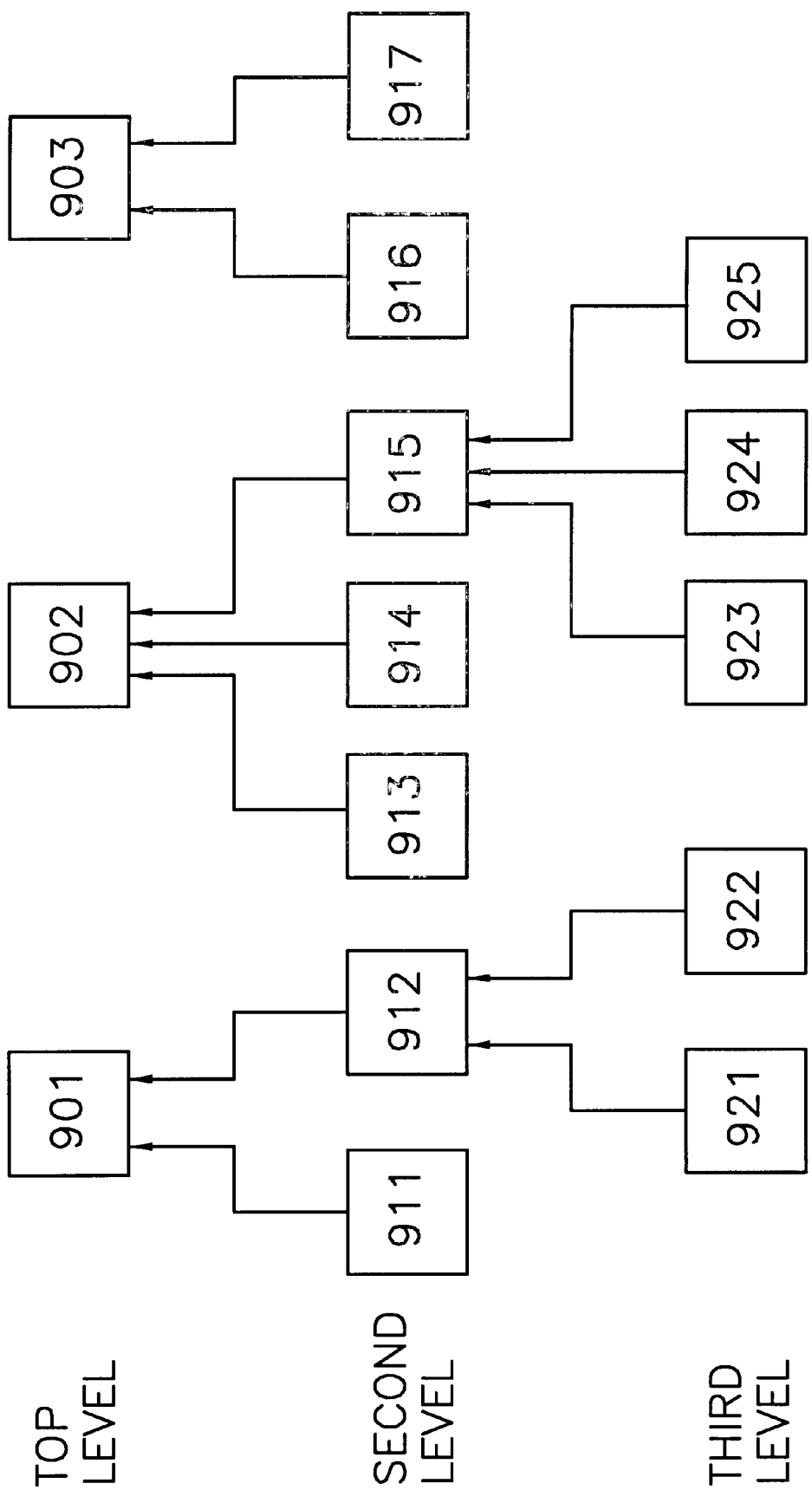
FIG. 9 illustrates a hierarchical tree structure of functions, objects, or methods.

A user may thereby locate useful alternative products 304 by searching at a higher level of generality. FIG. 9 illustrates that each function 801 (from FIG. 8) may be organized as part of a hierarchical tree structure, each function 801 either being on the top level such as top level functions 901–903, or having a link to a parent function 801, such as second level functions 911–917 and third level functions 921–925. The same hierarchical structure illustrated by FIG. 9 applies to objects 802 and methods 803 (see FIG. 8), each of which may be in the top level or may have a parent of its own type. Although the example herein illustrated shows three levels, there may in actuality be one or more levels, and there is no upper limitation on the number of levels. By way of further example, consider the user seeking alternatives to a ballpoint pen. The method 803 described as "ink" may have a more general parent method 803 described as "liquid," which may itself have a parent method 803 described as "matter" at the highest level of generality. If the user moves to the most general method 803, "matter," rather than the specific method 803 "ink," the user may locate pencils, fine paintbrushes, chalk, charcoal, or laser printers, all of which use matter other than ink to mark paper or write information.

Figure 10:
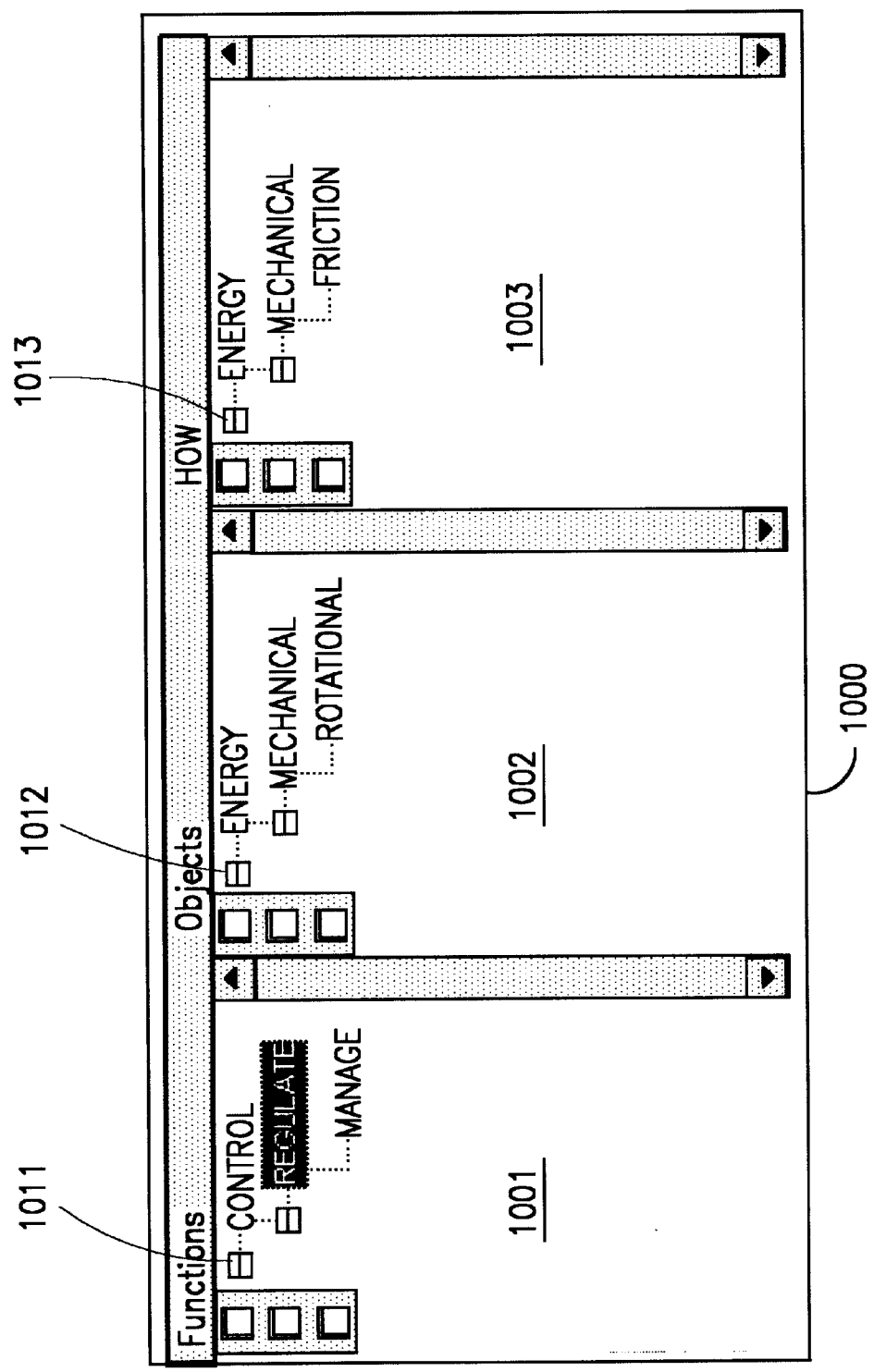
FIG. 10 shows a practical example of the hierarchies that were illustrated schematically in FIG. 9.

Shown in FIG. 10 is a practical example of the hierarchies that were illustrated schematically in FIG. 9. Functionality screen 1000 is divided into three panes: function pane 1001, object pane 1002, and method pane 1003. Function pane 1001 displays function list 1011, which comprises a set of selectable function values. Object pane 1002 displays object list 1012, which comprises a set of selectable object values. Method pane 1003 displays method list 1013, which comprises a set of selectable method values. In each pane, we see a hierarchy of terms, each of which is general at the top, more specific at the second level, and still more specific at the third level.

Structural Attribute Index Search

The next sequence of figures, FIG. 11 through FIG. 14, illustrate the means for a user to interactively select and retrieve desired graphical and/or text information. Also illustrated is the flexible dynamic hierarchy of structural attributes, as provided in the present invention, from the perspective of the user searching for a product.

Figure 11:
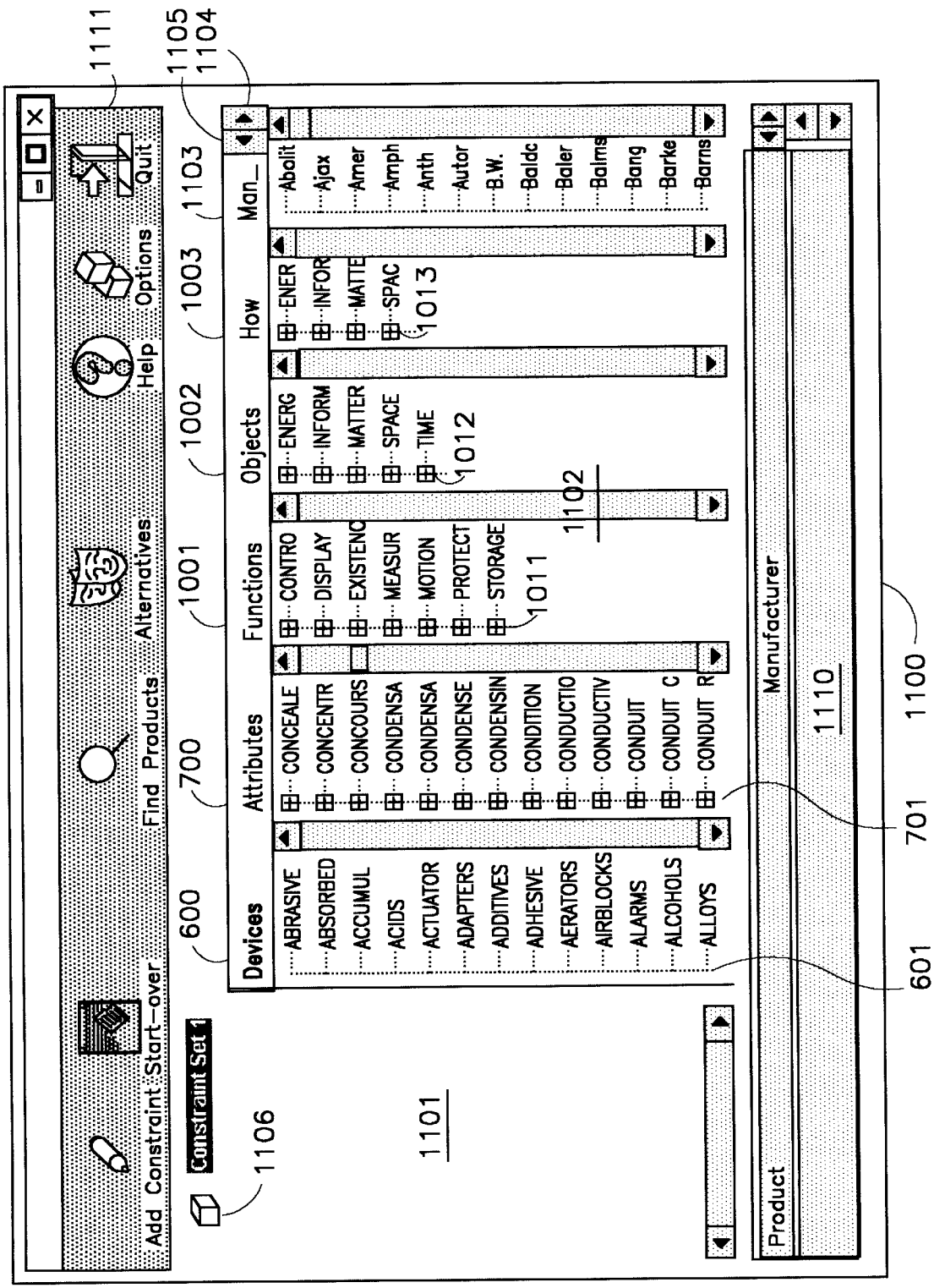
FIG. 11 shows a search option screen.

Referring now to FIG. 11, search option screen 1100 is displayed on the display device 106 of a system 100 (from FIG. 1) comprising a client workstation. Search option screen 1100 is divided into a plurality of panes, including search window 1101, product pane 1110, button bar 1111, and a search menu 1102 comprising one or more from the group of selectable categories consisting of device pane 600, attribute pane 700, function pane 1001, object pane 1002, method pane 1003, and manufacturer pane 1103. Within each selectable category is a set of selectable structural attribute and/or solution functionality values under the category, which include device list 601, attribute list 701, function list 1011, object list 1012, and method list 1013.

In order to view longer words or phrases than may fit into the displayed panes of the search option screen 1100, the user may select the hide button 1104 to hide the rightmost panes from view one at a time and display the remaining panes in a wider format. The user may subsequently unhide a previously hidden pane by selecting the unhide button 1105, which restores the hidden pane and returns the width of the panes to their previous state.

Search window 1101 displays a constraint set 1106 which serves as a "you are here" map or guidepost to the user by displaying the user's previously made selections within the database. In the illustration, the constraint set 1106 is empty, showing that no user selections have been made at this point in the search.

Figure 12:
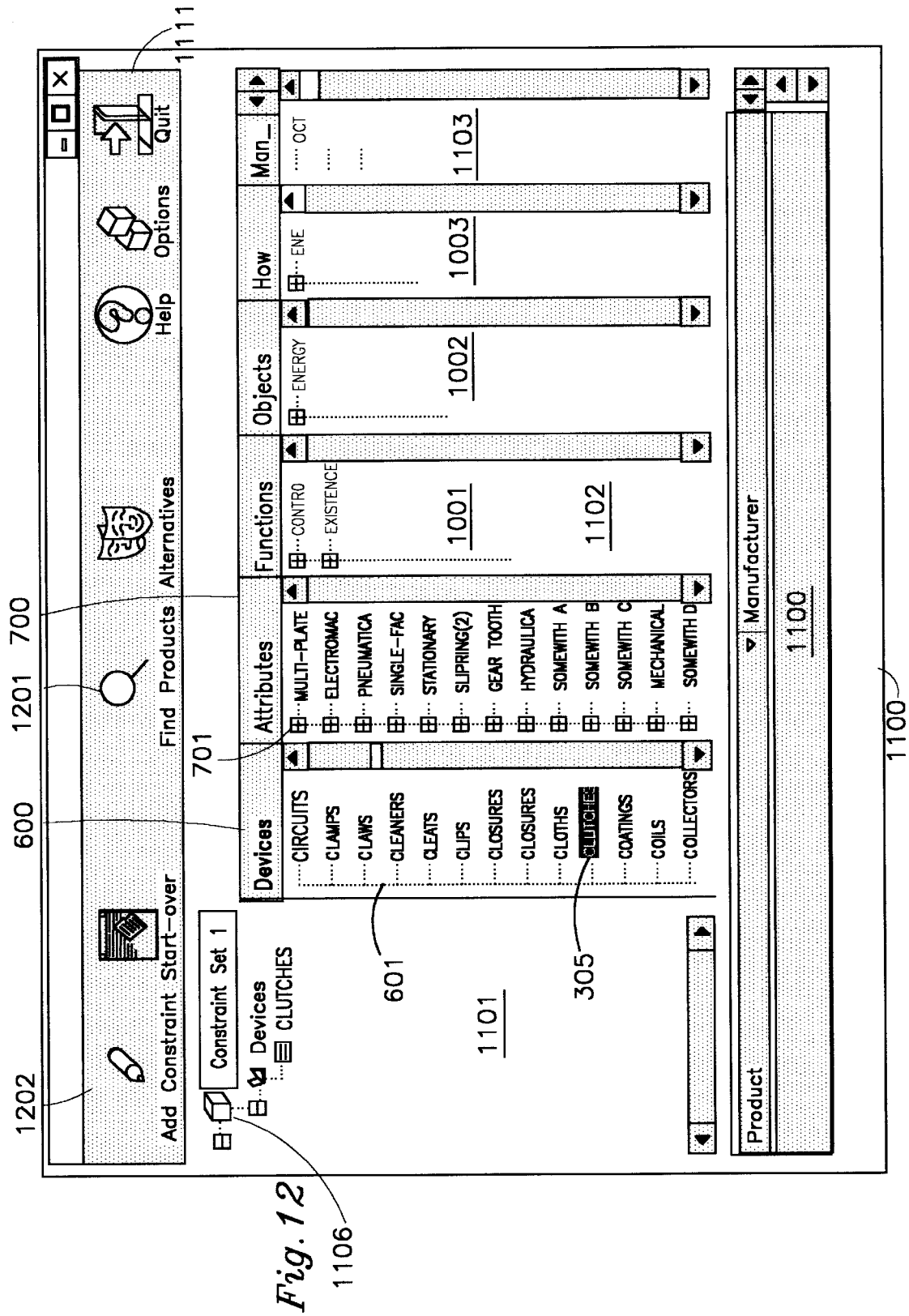
FIG. 12 shows what happens when the user selects a single device.

Upon selection by the user of a structural attribute value (such as device 305, from FIG. 3), or selection by the user of a solution functionality value, a revised set of selectable values is computed meeting the criteria of the selected value. Referring now to FIG. 12, shown is what happens when the user selects a single device 305 from device list 601, which the user may do by double-clicking the desired value in device list 601 with pointing device 107. The selected classification of device 305, identified by the user as "clutches," is now highlighted in device pane 600, and has been added to constraint set 1106. Constraint set 1106 displays the user's selections within the database; in the illustration, constraint set 1106 shows first that a device 305 has been selected, and shows next the name of the specific device 305 that has been selected at this point in the search.

At any time when the user selects a particular device 305, or any other particular selectable value from the search menu 1102, all lists on the search option screen 1100 are dynamically updated to display only what is available for the products 304 described by the selected value or values. For example, the attribute list 701 is dynamically updated to display only those attributes 306 available for the products 304 that relate to the selected device 305. Dynamic updating of the search menu 1102 removes from the attribute list 701 all attributes 306 that are not relevant to the selected device 305. Dynamic updating also removes from the lists within all other panes of the search menu 1102 all values within those lists that are not relevant to the selected device 305. Referring to the illustration in FIG. 12, the size of each of these lists has become smaller, as the number of relevant products 304 is narrowed.

Once a selection has been made, products button 1201, identified by the label "Find Products," becomes visible on button bar 1111. If the user selects products button 1201, the list of all products 304 which meet the criteria of the selected values shown in constraint set 1106 will be displayed in product pane 1110.

Having created the first constraint set 1106 by making a selection of a selectable value from search menu 1102, the user may not only continue to add constraints to constraint set 1106, but may also choose to create additional sets of criteria for one or more new constraint sets 1106, and display lists of products which meet the criteria of any constraint set 1106 by switching between them. A new constraint set may be added by selecting constraint button 1201. The user may switch the display in search menu 1102 between or among constraint sets 1106 by selecting the desired constraint set in search window 1101.

Figure 13:
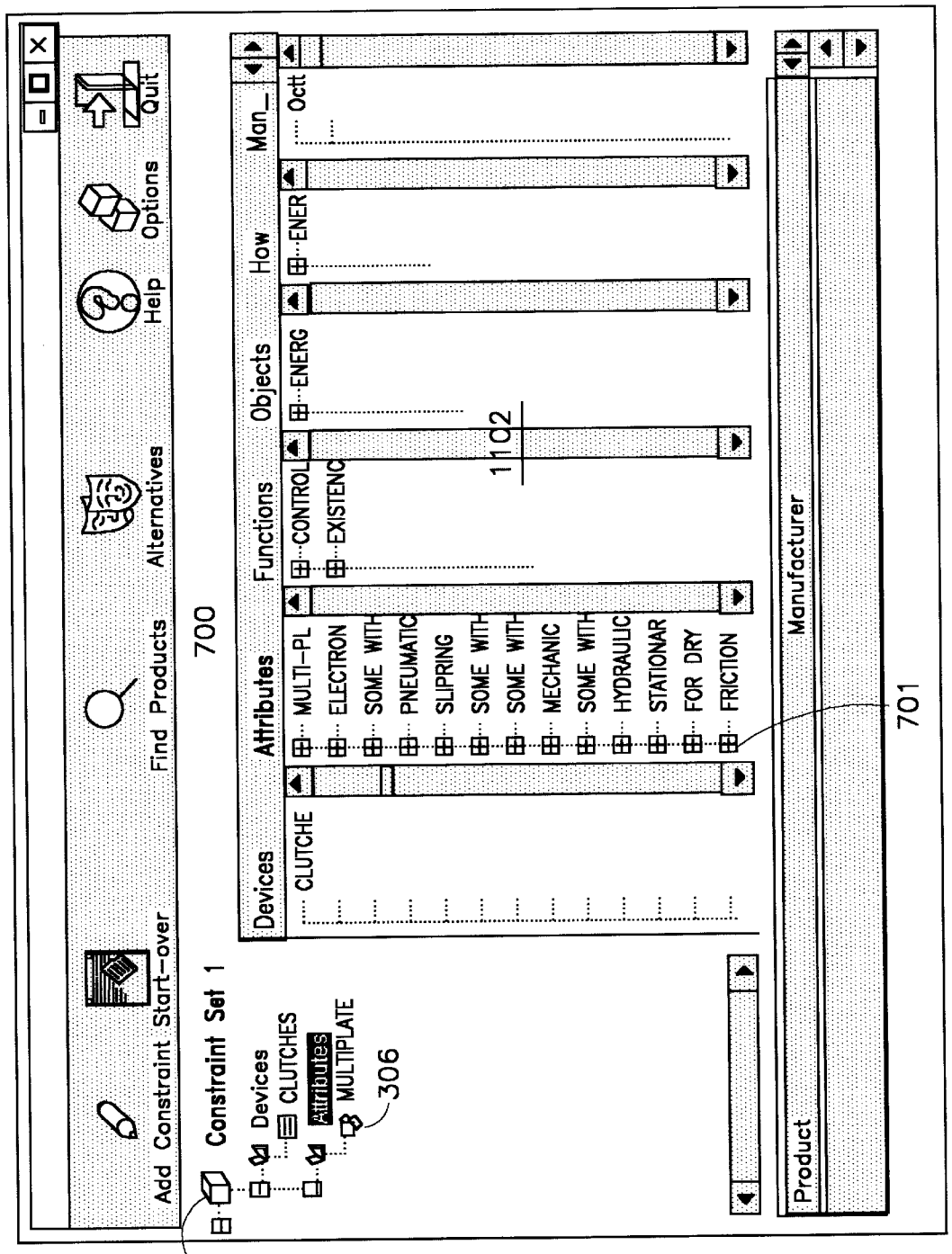
FIG. 13 illustrates addition by the user of additional selection criteria.

Referring now to FIG. 13, the user continues to add criteria to the first constraint set 1106. The user has next selected an attribute 306 from attribute list 701. The sequence of selections by the user is displayed under constraint set 1106. The user selected an attribute 306 identified as "multi-plate," which is displayed under constraint set 1106 and at the top of attribute pane 700. Upon selection by the user of attribute 306, a revised set of selectable values is computed meeting the criteria of the selected value as well as the previously selected criteria shown in constraint set 1106.

At any time when the user selects a particular selectable value from the search panes, all lists displayed in the search menu 1102 are dynamically updated to display only what is available for the products 304 (from FIG. 3) described by the selected value. Dynamic updating removes from the lists within every pane of the search menu 1102 all values within those lists that are not relevant to the selected combination of device 305 and attribute 306 (from FIG. 3). The number of relevant products 304 is further narrowed in the present example, having first been narrowed when the user selected a device 305 (from FIG. 3) identified as "clutches," and again when the user selected an attribute 306 identified as "multi-plate." Each time, the attribute list 701 shrinks as it is updated to display only attributes 306 that describe the remaining products 304 relating to the constraint set 1106. The attribute list 701, as shown in FIG. 13, now includes only the attributes 306 that are available to products 304 that could be described as "multi-plate clutches."

Figure 14:
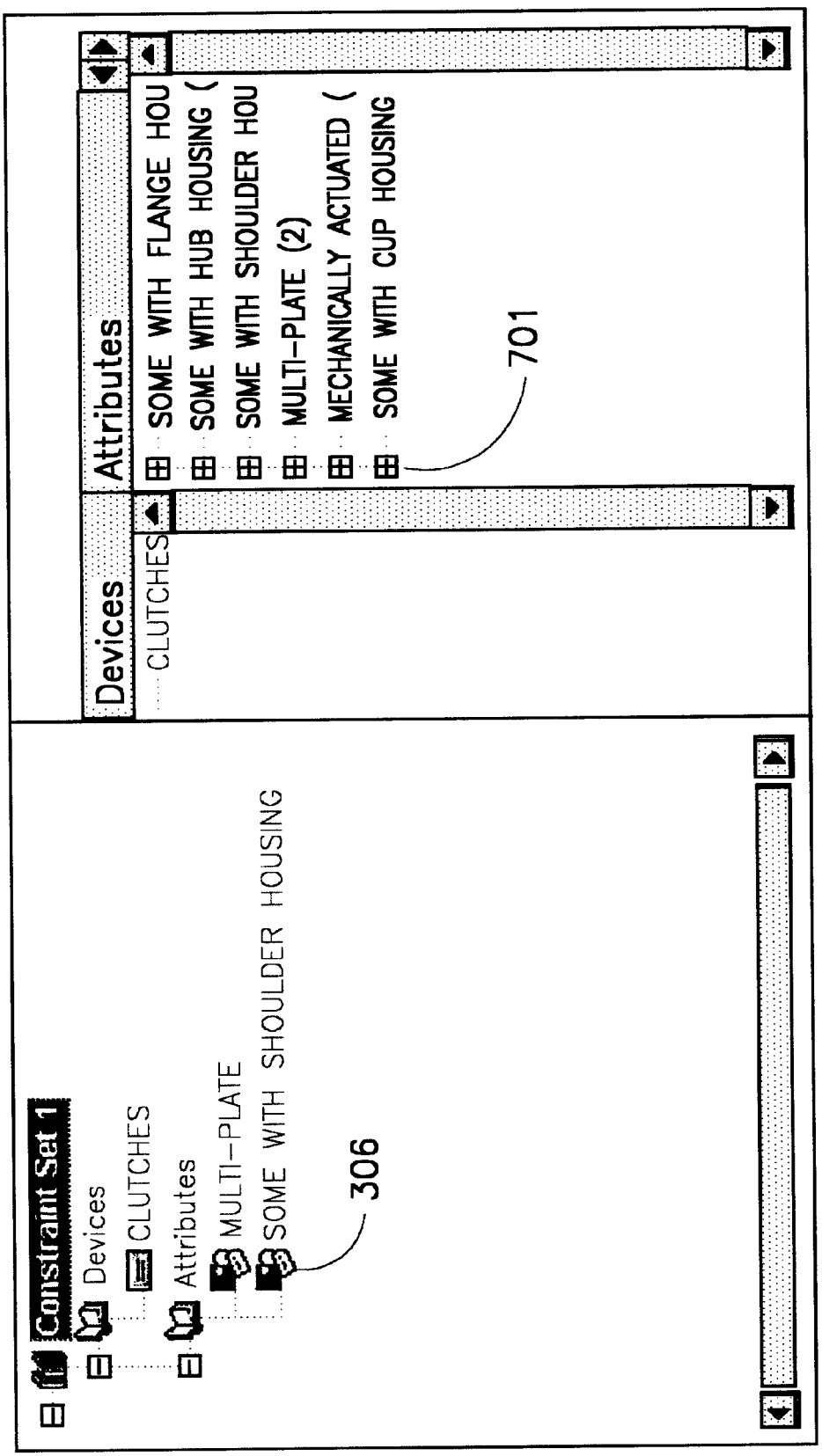
FIG. 14 illustrates the result of selecting an additional attribute.

FIG. 14 illustrates the result of selecting an additional attribute 306. The attribute list 701 now includes only the attributes 306 that correspond to products 304 (from FIG. 3) that could be described as "multi-plate clutches available with shoulder housings." From this flexible dynamic hierarchy, the user learns that certain clutches meeting those narrow criteria are "mechanically actuated," because that attribute 306 remains displayed in attribute list 701, even though the user may never have realized that "mechanically actuated" was an available attribute, or may never have thought to search for mechanically actuated" clutches.

Viewing Products

When the user chooses to find products, he or she presses products button 1201 (from FIG. 12), and the invention displays a list of all products meeting) the criteria of the selected structural attribute and/or solution functionality values. The result is shown in FIG. 15, which illustrates product pane 1110 (from FIG. 11). In product pane 1100 is displayed the list of all products 304 (from FIG. 3) which meet the criteria of the selected values shown in constraint set 1106 (from FIG. 11).

Figure 16:
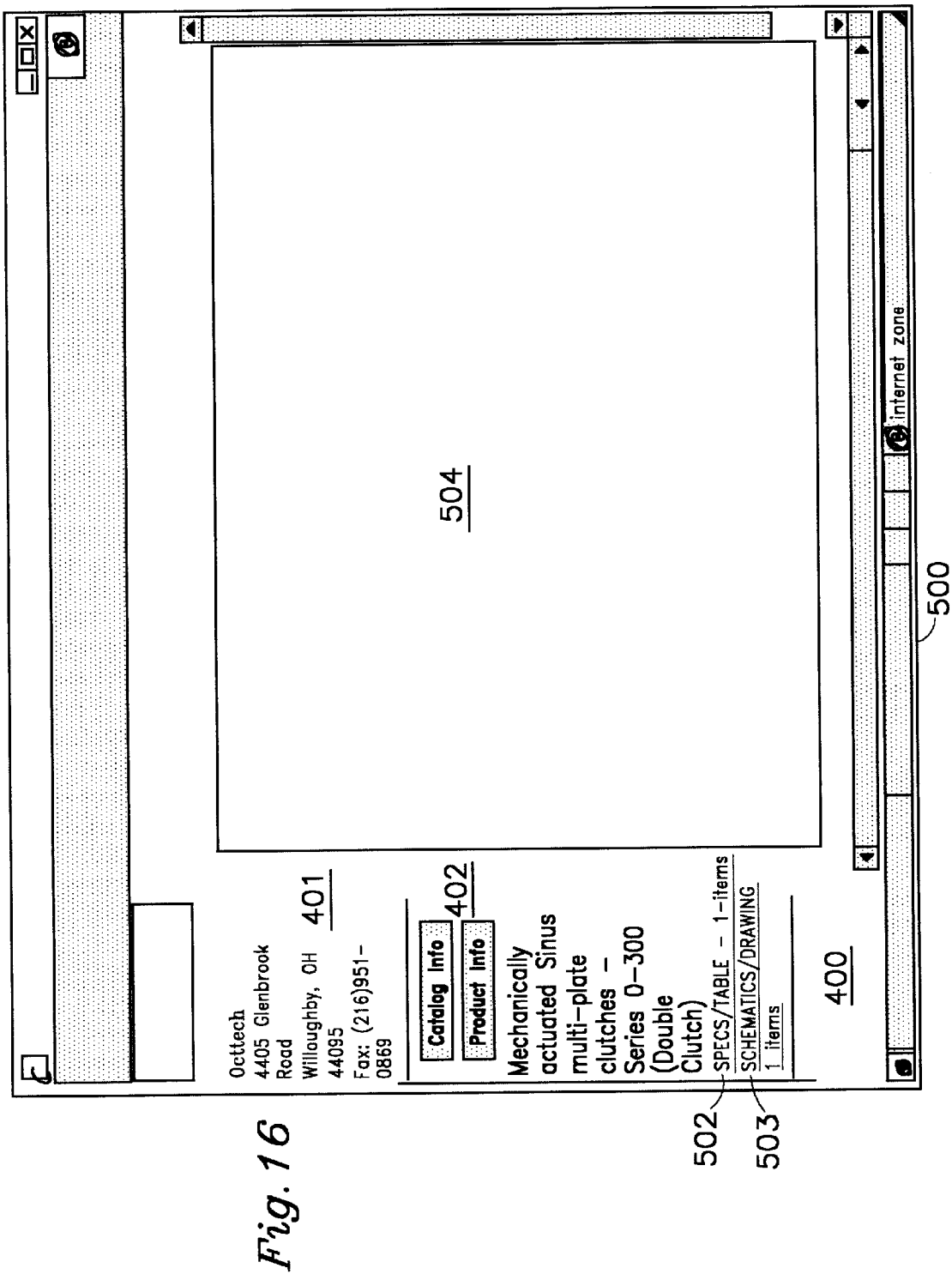
FIG. 16 shows the result of selecting one of the listed products from the product pane.

FIG. 16 shows the result of selecting one of the listed products from product pane 1100. Upon selection by the user of a product from the list of products in product pane 1100, the invention displays a list of classifications of portions of product catalogue pages for the selected product 304 (from FIG. 3). In a preferred embodiment, a client web browser shows display screen 500 (from FIG. 5), and display panel 400 (from FIG. 4) is shown within the left side of display screen 500. Pane 401 (from FIG. 4) displays information about the manufacturer 300 (from FIG. 3), and pane 402 displays information drawn from the catalogue 301 (from FIG. 3) This example specifically shows, in pane 402, two classifications of portions of product catalogue pages, specs/table 502 (from FIG. 5) and schematics/drawing 503 (from FIG. 5).

Upon selection by the user of a classification from this list of classifications of portions of product catalogue pages, page display 504 (from FIG. 5) shows the cropped rectangular region of the graphical page image 210 (from FIG. 2) corresponding to the particular selected classification. This was previously discussed in relation to the illustration in FIG. 5, which shows an instance of a product portion 303 (from FIG. 3) that has been classified as specs/table 502.

By switching between display windows and resizing display windows, which are operating system functions that are well-known in the art, the user who selects multiple products 304 will simultaneously display two or more portions of catalogue pages corresponding to two or more selected products, to permit the user to compare two or more products in separate windows.

Solution Functionality Index Search

The present invention allows the user to view information associated with other products having similar solution functionality to a selected product.

Figure 17:
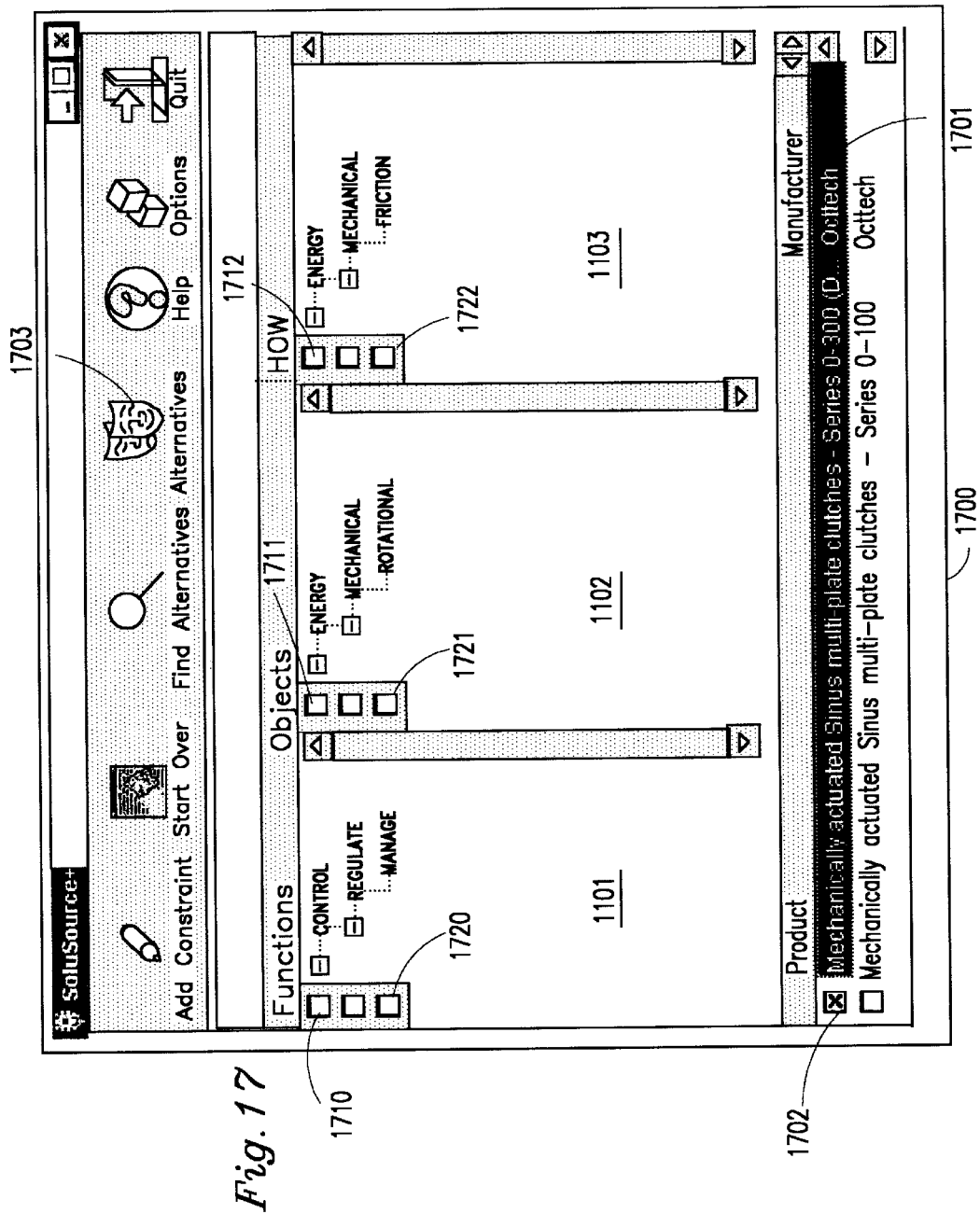
FIG. 17 illustrates the alternatives screen.

Referring now to FIG. 17, shown is an illustration of the alternatives screen 1700. Whenever products are selected, the user chooses to view information associated with alternative products by selecting the alternatives button 1703, which indicates his or her choice to search for alternatives to the selected product 304, that is, matching the functionality of the selected product 304. The invention then displays a search option screen in the form of alternatives screen 1700 including a set of selectable solution functionality values corresponding, to the solution functionality of the product previously chosen by the user.

The alternatives screen 1700 places into context the function pane 1101, object pane 1102, and method pane 1103 (from FIG. 11). The alternatives screen 1700, as illustrated, relates to a selected product 304 (from FIG. 3), displayed by product name and manufacturer on a selection line 1701, and selected by the user by selecting checkbox 1702. The function pane 1101, object pane 1102, and method pane 1103 each display the most specific functions 801, objects 802 and methods 803 (from FIG. 8) for the selected product. Each pane 1101–1103 also displays the more general functions 801, objects 802 and methods 803 that are higher in their respective hierarchies than the most specific match for the product 304, and thereby can provide a more generalized solution functionality search.

Reading across the highest level of terms displayed in function pane 1101, object pane 1102, and method pane 1103, the user may create a general search for all products 304 that "control energy by means of energy," by selecting the checkboxes 1710–1712. Reading across the lowest level of terms displayed in function pane 1101, object pane 1102, and method pane 1103. the user may create a specific search for all products 304 that "manage rotational energy by means of friction," by selecting the checkboxes 1720–1722.

Conclusion

What have been described are only some examples of methods and systems according to the invention. Accordingly, it is to be understood that various and numerous other arrangements may be devised by one skilled in the art without departing from the spirit and scope of the invention as limited only by the accompanying claims.

What is claimed is:

1. A method for organizing and retrieving graphical and/or text information pertaining to products, comprising:
 a. providing a computerized database;
 b. entering into said database graphical and/or text information from product catalogues pertaining to said products;
 c. determining, and entering into said database, structural attribute classification values of said products;
 d. determining, and entering into a solution functionality index of said database, solution functionality classification values of said products;
 e. providing means for a user to interactively select and retrieve desired graphical and/or text information from said database by dynamically displaying only relevant classification values as the user selects desired structural attribute classification values or desired solution functionality classification values, until the user chooses to select products or to view information associated with selected products;
 f. providing means for a user to view information associated with selected products;
 g. providing means for a user who has selected a product to view information associated with other products having similar solution functionality.

2. The method of claim 1 wherein the step of providing a computerized database comprises providing a network web server accessing a database which may be accessed by means of the Internet.

3. The method of claim 1 wherein the step of entering graphical and/or text information comprises:
 a. selecting a product catalogue to be included in said database;
 b. scanning each page of said selected product catalogue to produce files comprising scanned images of each page;
 c. determining, and entering into said database, manufacturer information and catalogue information relating to said selected product catalogue;
 d. indexing said scanned images by:
  (i) viewing an image of a page;
  (ii) selecting a cropped graphical or textual portion of said viewed page;
  (iii) determining, and entering into said database, page identification and coordinates within the page of said selected portion.

4. The method of claim 3 wherein said scanning further comprises converting textual portions of said scanned images by means of optical character recognition to produce text files comprising textual information appearing on each page.

5. The method of claim 3 wherein said indexing further comprises determining and entering into said database a product name for each product; determining whether each selected graphic or text portion corresponds to a product; and if so, entering into said database which corresponding product corresponds to said selected graphic or text portion.

6. The method of claim 3 wherein said indexing further comprises determining, and entering into said database, a classification corresponding to said selected graphic or text portion, wherein said classification may comprise one or more selected from the product-specific group consisting of specifications, descriptive text, pictures, drawings, schematics, tables, and the like; or may comprise one or more selected from the non-product-specific group consisting, of the front cover, back cover, general company information, general product information, logo, warranty information, and the like.

7. The method of claim 1 wherein the step of determining, and entering into said database, structural attribute classification values comprises
 a. determining, and entering into said database, one or more device identifications corresponding to said product; and
 b. determining, and entering into said database, one or more structural attributes of the product, wherein said structural attributes may comprise one or more selected from the group consisting of material, composition, features, inputs, outputs, capabilities, limitations, options, locations, design characteristics, physical characteristics, and the like.

8. The method of claim 1 wherein the step of entering into said database structural classification values of said product further comprises building a flexible dynamic hierarchy of said structural attributes; and wherein the step of entering into said database solution functionality classification values of said product further comprises building a flexible dynamic hierarchy of said solution functionality classification values.

9. The method of claim 1 wherein the step of determining, and entering into said database, solution functionality classification values comprises:
 a. determining, and entering into said database, one or more functions of the product corresponding to said selected product;
 b. determining, and entering into said database, one or more objects of said functions;
 c. determining, and entering into said database, one or more method descriptors identifying how each function relates to or achieves an object of said selected product.

10. The method of claim 1 wherein the step of providing means for a user to interactively select and retrieve desired graphical and/or text information further comprises providing a flexible dynamic hierarchy of structural attribute classification values and/or solution functionality classification values.

11. The method of claim 1 wherein the step of providing means for a user to interactively select and retrieve desired graphical and/or text information comprises:
 a. displaying on a client workstation a search option screen comprising a set of selectable categories and a set of selectable structural attribute and/or solution functionality values under each said category;
 b. upon selection by a user of one or more structural attribute and/or solution functionality values, computing a revised set of selectable values meeting the criteria of said selected value(s).

12. The method of claim 11 further comprising providing means to create additional sets of criteria and displaying a list of products which meets the criteria of either set.

13. The method of claim 1 wherein the step of providing means for a user to view information associated with selected products comprises:
 a. displaying a list of all products meeting the criteria of said selected structural attribute and/or solution functionality value(s);
 b. upon selection by the user of a product from said list of products, displaying a list of classifications of portions of product catalogue pages for said selected product;
 c. upon selection by the user of a classification from said list, displaying the cropped portion of the product catalogue page meeting the criteria of said classification.

14. The method of claim 13 further comprising providing means to simultaneously display two or more portions of catalogue pages corresponding to two or more selected products to permit the user to compare two or more products.

15. The method of claim 1 wherein the step of providing means to view information associated with other products having similar solution functionality comprises:
  a. providing means for the user to choose to view information associated with alternative products;
  b. displaying on a client workstation a search option screen comprising a set of selectable solution functionality values corresponding to the solution functionality of the product previously chosen by the user.

16. The method of claim 1 further comprising means to expand one or more values and thereby display values associated with the expanded value.

17. The method of claim 1 further comprising having one or more engineers enter, index, and/or review all data entered into said database.

18. A method for identifying a product or device having desired attributes or functionality comprising:
  providing a web server which accesses a computerized database, said database comprising:
    a. graphical images of catalogue pages or portions of catalogue pages;
    b. coordinates of said pages and/or portions;
    c. classification of said pages and/or portions;
    d. device identification of the product associated with said pages and/or portions;
    e. structural attributes of the product associated with said pages and/or portions;
    a solution functionality index comprising one or more solution functionality classification values of the product associated with said pages and/or portions;
  said web server programmed to provide display information when accessed by a client web browser or software application, to provide selection options, and to compute responses upon receipt of selections from said client;
  wherein a set of categories having an initial set of selectable structural attribute values and/or solution functionality values is displayed on a client browser or software application;
  wherein upon selection of one or more desired values under associated categories, a revised set of selectable values is displayed, said revised set meeting the criteria of the selected structural attributes and/or solution functionalities of said initial set;
  wherein upon selection of any additional values from said revised set, further revised set(s) of selectable values, is/are displayed;
  wherein at the request of said client, a list of all products meeting the criteria of all the selected value(s) is displayed;
  wherein upon selection by the user of a product from said list of products, a list of classifications of pages or portions of product catalogue pages for said selected product is displayed;
  wherein upon selection by said client of a classification from said list of classifications, the portion of the product catalogue page meeting the classification criteria is displayed;
  wherein upon request by said client to see alternatives to a product previously selected, a new list of selectable solution functionality values is displayed, corresponding to those of the previously selected product.

19. A computer implemented system for identifying desired products and viewing information associated with said products, comprising an electronic computer having a processor and a database, said database having the following information:
  a. graphical images of catalogue pages or portions of catalogue pages;
  b. coordinates of said pages and/or portions;
  c. classification of said pages and/or portions;
  d. device identification of the product associated with said pages and/or portions;
  e. structural attribute values of said product associated with said pages and/or portions;
  f. a solution functionality index comprising one or more solution functionality classification values values of said product associated with said pages and/or portions, said solution functionality values consisting of function, object, and method;
  said system adapted to display a search option screen comprising one or more selectable categories and one or more selectable structural attribute and/or solution functionality values under each said category;
  said system further adapted, upon selection of one or more structural attribute and/or solution functionality values within a selected category, to display a subset of values which meet the criteria of said selected values,
  said system further adapted to display at the request of a client a list of all products which meet the criteria of said selected value(s), and upon selection by said client of one or more products from said list, to display a list of classifications of said portions of product catalogue pages for said selected product(s), and upon selection by said client of a classification from said list of classifications, to display the portion(s) of said product catalogue page(s) meeting said classification criteria;
  said system further adapted to display information associated with alternative products having similar solution functionality values to a product previously selected.

20. The computer implemented system of claim 19, wherein said database is accessed by means of a server and a client each having a connection to the Internet, and wherein said search option screen is displayed on a client web browser or software application.

21. The computer implemented system of claim 19, wherein said database is accessed by means of a server and a client each having a connection to the Internet, and wherein said list of classifications of portions of product catalogue pages and said portions of product catalogue pages are displayed on a client web browser or software application.

* * * * *